Jan. 10, 1967    F. B. LEVERDINGEN    3,296,730
RETRIEVING DEVICES FOR FISH LURES
Filed Aug. 28, 1964
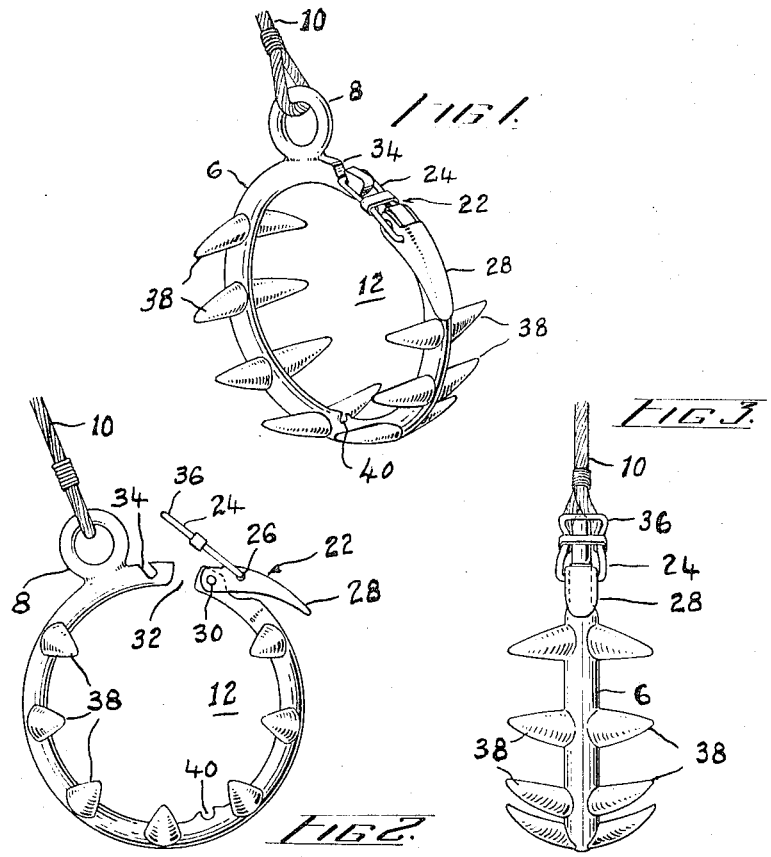
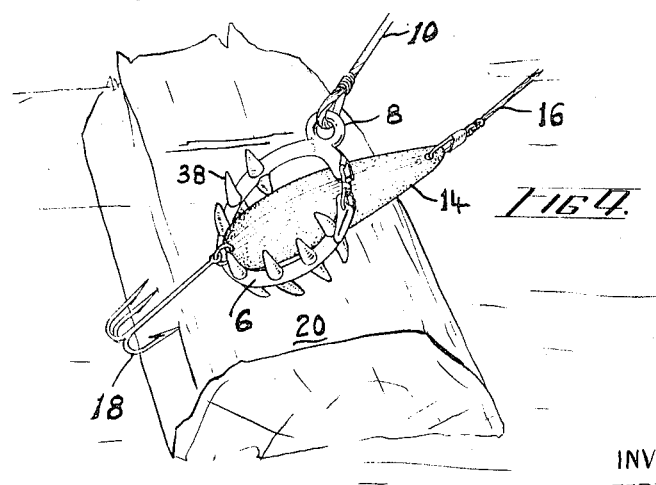
INVENTOR
FERDINAND B. LEVERDINGEN
BY
*Frederick C. Bromley*
ATTORNEY

3,296,730
RETRIEVING DEVICES FOR FISH LURES

Ferdinand B. Leverdingen, Toronto, Ontario, Canada
(60 Lurgan Drive, Willowdale, Ontario, Canada)
Filed Aug. 28, 1964, Ser. No. 392,744
4 Claims. (Cl. 43—17.2)

My invention pertains to retrieving devices for fish lures and has for its object to provide an efficient and reliable device of this kind for recovery of lures when an associated fish hook has become caught on an object in the water such as a sunken log.

A further object of my invention is to provide a retrieving device of a simple and strudy structure, and one adapted to be placed loosely on a fishing line so that it will slide down therealong to securely embrace the lure by an arrangement of flukes for release of the lure attendant upon a pull of a hauling line.

My invention comprises a ring-like retrieving device providing a passage therethrough for admitting a lure and having flukes thereon arranged to secure an admitted hook so that it can be pulled free when a fish hook has become caught on an object in the water. The flukes are circumferentially disposed in spaced relation and preferably project outwardly at opposite sides of the retrieving device. A split in the ring-like retriever provides for placing it on the fishing line and desirably the entrance opening is closed by a closure device which is swingable between closed and open positions. A portion of the passage-forming wall is desirably formed with a notch to receive the fishing line for guidance of the ring-like member when it is being lowered for a retrieving operation. The ring-like member is made of a suitable metal and is desirably mouldably formed as a casting.

Having related the major objects and advantages of my invention subsidiary objects and advantages will appear from the ensuing specification and the accompanying drawing wherein a selected embodiment of the invention is shown.

In the drawing:

FIG. 1 is a perspective view of the retrieving device;

FIG. 2 is a side view thereof showing the closure device for the admittance opening disposed in open condition to admit a fishing line;

FIG. 3 is an edge view of FIG. 2; and

FIG. 4 is a view illustrating how the retrieving device secures a lure for pulling it free when a fish hook has become caught on a log or other object in the water.

Referring to the drawing in detail, the retrieving device comprises a substantially circular member 6 in the form of a metal ring having an integral eye 8 in a plane containing the ring which serves to make a connection with a hauling line or cable 10 by which a fisherman lowers the retriever in a retrieving operation.

The circular member 6 provides a passage 12 therethrough and the passage 12 is dimensioned to freely admit a lure such as that illustrated at 14 in FIG. 4. The lure may be of any conventional type common to still fishing, casting or trolling and is shown as fastened to a fishing line 16 and provided with a gang hook 18.

The member 6 is split in order to provide an entrance opening 32 leading to the pasasge 12 and the split is located at a side of the eye 8. The split provides a gap of sufficient width to admit the fishing line 16 and is supplied with closure means, generally indicated at 22. The closure means, by way of example but not of limitation, may consist of a toggle member 24 pivoted at 26 on a toggle finger 28.

The toggle finger 28 is fulcrumed at 30 on an end of the member 6 adjacent to the opening 32 and the other end of the member 6 is supplied with an inclined slot 34 opening outwardly and receptive to the loop end 36 of the toggle member 24. This latching device is of a known type and it will be understood that when the loop end 36 is dropped into the slot 34, in the release position of the toggle arm 28, a locking effect is secured by pressing on the toggle finger 28 to urge it to the locking position shown in FIG. 1.

On the circular member 6 is a plurality of flukes 38 integral therewith and circumferentially spaced, there being preferably two sets, one on each side of the member 6 and directed outwardly therefrom on a slight inward curvature. The flukes are shown as of a round cross section tapering to a point which has been found to be a very effective configuration for making a secure connection with a lure for purposes of pulling it free when an attached hook is caught upon an immovable object in the water. The number of flukes may vary and it is important that the flukes be omitted from the area adjacent the eye 8 in order that the eye portion of the ring member 6 may be disposed in close proximity to the lure for pulling it free when a hook is snagged. FIG. 4 illustrates how the retriever functions in taking a secure hold on the lure to free it when caught on an object in the water.

In the use of the retriever it is only necessary to release the toggle element 24 and swing it clear of the entrance opening 32 in order to engage the retriever with the fishing line 16 whereupon toggle element 24 may be swung into re-engagement with the notch 34 and locked by the toggle arm 28 in order to close the opening 32. Desirably a wall portion of the passage 12 may be provided with a notch 40 opposite the eye 8 receptive to the fishing line 16, so that the line may be engaged therein for guiding the member 6 in its descent to the lure.

The retrieving device is inexpensive to manufacure and simple to use, moreover, it is reliable and serviceable. It will be manifest that incidental changes and variations may be resorted to as coming within the scope of the invention defined in the subjoined claims.

What I claim is:

1. A lure retrieving device for use with a hauling line in retrieving a snagged lure suspended on an end of a fishing line, comprising: ring means having a central opening of sufficient size to loosely receive said snagged lure, said ring means including a portion movable relative to an adjacent portion thereof to selectively open and close an entrance slot communicating with said central opening to permit the positioning of said fishing line within said ring, an eyelet secured to said ring means and positioned in the plane thereof for attachment to said hauling line, a plurality of pairs of rigid fluke members secured to said ring means in spaced relation about a portion of the periphery thereof and curvingly inclined outwardly from the plane thereof in opposed relation towards the central axis of the ring means, whereby in operation the ring is lowered over a snagged lure and the hauling line is tensioned, adjacent ones of the fluke members providing pulling engagement of the device with the snagged lure to permit the exertion of retrieving force thereagainst by the hauling line.

2. A lure retrieving device as claimed in claim 1 wherein asid fluke members are secured to a semicircular portion of the periphery of the ring means positioned generally oppositely of the line attachment eyelet to provide an unobstructed ring portion adjacent the line attachment, whereby the lowering of the ring over a snagged lure is facilitated.

3. A lure retrieving device as claimed in claim 1 in which said movable portion of said ring means is pivotally secured thereto for outward opening pivotal movement in the plane of the ring.

4. A lure retrieving device as claimed in claim 3 including an eye portion attached to said pivotally mounted ring portion to provide positive attachment of said adjacent ring portion in the closed position.

References Cited by the Examiner

UNITED STATES PATENTS

| | | | |
|---|---|---|---|
| 2,235,371 | 3/1941 | Jyrkas | 43—5 |
| 2,479,448 | 8/1949 | Woock | 43—17.2 |
| 2,597,229 | 5/1952 | Cox | 43—17.2 |
| 2,634,539 | 4/1953 | Brown et al. | 43—17.2 |
| 2,676,430 | 4/1954 | Richard | 43—17.2 |
| 2,926,449 | 3/1960 | Rupert | 43—17.2 |

FOREIGN PATENTS

| | | |
|---|---|---|
| 1,326,907 | 4/1963 | France. |
| 24,502 | 11/1904 | Great Britain. |
| 26,120 | 1906 | Great Britain. |

SAMUEL KOREN, *Primary Examiner.*

WARNER H. CAMP, *Assistant Examiner.*